(12) United States Patent
Reed

(10) Patent No.: US 6,526,673 B1
(45) Date of Patent: Mar. 4, 2003

(54) WINGED MEASURING TAPE

(76) Inventor: Charles R. Reed, 16872 M 60 E., Vandalia, MI (US) 49095

( * ) Notice: Subject to any disclaimer, the term of this patent is extended or adjusted under 35 U.S.C. 154(b) by 0 days.

(21) Appl. No.: 09/939,550

(22) Filed: Aug. 27, 2001

(51) Int. Cl.[7] .................................................. G01B 3/10
(52) U.S. Cl. ................................. 33/761; 33/42; 33/760
(58) Field of Search ........................ 33/755, 759, 760, 33/761, 768, 770, DIG. 1, 455, 42, 412, 529

(56) References Cited

U.S. PATENT DOCUMENTS

| | | | | |
|---|---|---|---|---|
| 3,568,319 A | * | 3/1971 | Moll | 33/340 |
| 4,200,984 A | * | 5/1980 | Fink | 33/427 |
| 4,375,721 A | * | 3/1983 | Ueda | 33/759 |
| 4,967,482 A | * | 11/1990 | Hoover et al. | 33/42 |
| 5,337,487 A | * | 8/1994 | Mangino, Sr. | 33/760 |
| 5,848,481 A | * | 12/1998 | Parsons et al. | 33/42 |
| 6,098,303 A | * | 8/2000 | Vogel | 33/759 |
| RE36,887 E | * | 10/2000 | Goldman | 33/760 |

* cited by examiner

Primary Examiner—Christopher W. Fulton
Assistant Examiner—Yaritza Guadalupe
(74) Attorney, Agent, or Firm—Walter D. Ames, Esq.

(57) ABSTRACT

An otherwise conventional measuring tape which typically includes a six-faced housing or casing with a flexible and spring biased measuring tape spirally wound therein, is provided with a pair of straight wings. Each wing is pivoted at one end thereof to one face or surface of the housing by its own pivot pin. Each wing, near its respective pivot pin, is provided with an arcuate set of teeth, as in the form of gear teeth. These two sets of teeth intermesh with each other so that when one wing is rotated about its pivot, the other wing will rotate as well. Upon angular extension of the wings to their open position, they are aligned and form a straight edge. In their closed or nested position, they do not interfere with the usual mode of operation of the tape and casing. Each wing is L-shaped in transverse cross-section.

5 Claims, 1 Drawing Sheet

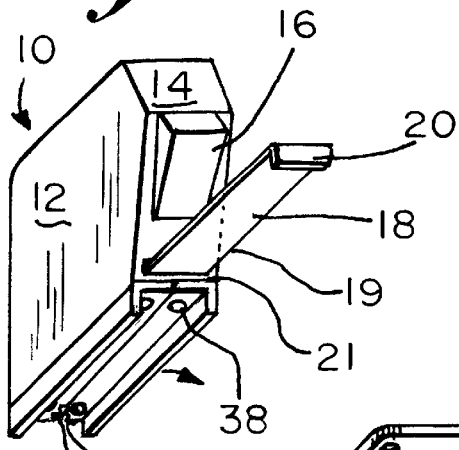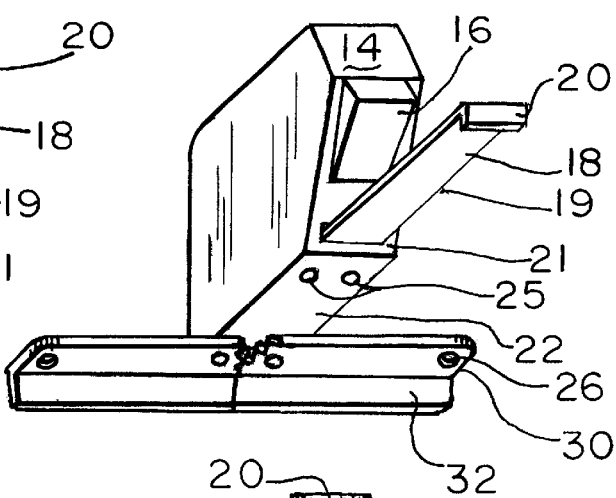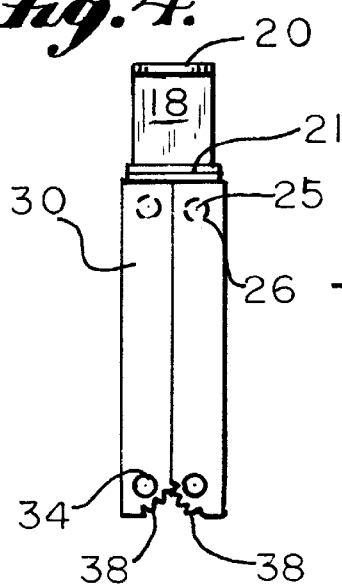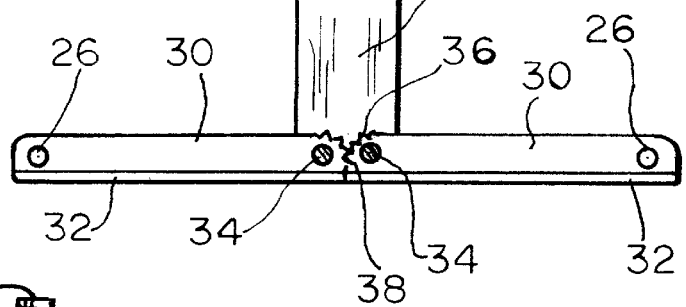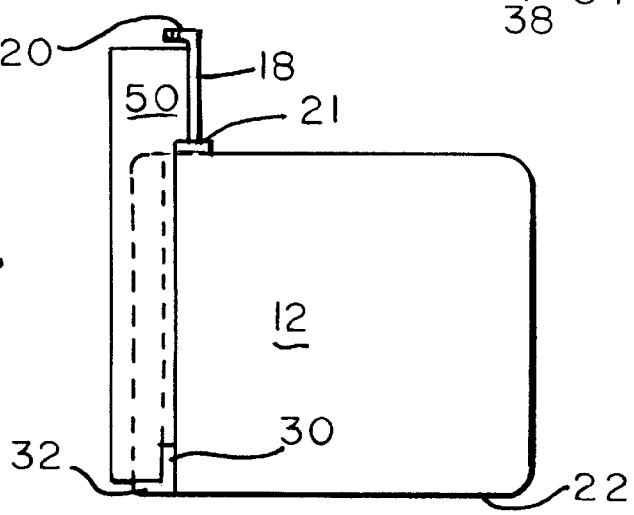

WINGED MEASURING TAPE

This invention relates to a measuring tape construction of the type commonly employed by carpenters and builders. The measuring tape of this invention exhibits utility in measuring distances between edge and end portions of pieces of lumber, the width of doorways, and the like. Additionally, the construction of this invention permits other uses, as will presently be described.

BACKGROUND OF THE INVENTION

This art is aware of somewhat similar devices, such as shown in U.S. Pat. No. 5,337,487 issued to Mangino, and U.S. Pat. No. 6,098,303 issued to Vogel. In both of these constructions, a more or less conventional flexible tape measure and casing is provided with one or more legs. In the Mangino construction, a pair of pivoted or swingable arms 14L and 14R is provided, with each arm pivotally secured to its respective own shaft 16L and 16R. These arms, when in an extended mode, form a T square. In Vogel, a flexible tape casing is provided a straight edge 26 and an edge guide 30. While exhibiting utility for their respective intended purposes, neither of these two constructions exhibits the characteristics and features of the present invention

SUMMARY OF THE INVENTION

In general, the invention is characterized by an otherwise generally conventional flexible measuring tape and casing therefor, the casing being provided at one of its surfaces with a pair of pivoted and elongated wings of metal or other stiff material, such as a hard plastic. The construction is such that the wings may be folded to a position parallel to each other, or alternatively, may be folded outwardly to a position where the wings are aligned with each other. In this latter position or configuration, corresponding edges or surfaces the wings are aligned, this permitting them to function as a straight edge. Additionally, when the wings are folded outwardly and the bottom of the casing placed on a flat surface, they prevent the casing from tipping over from an upright position. In extended position the inside angle between the casing and the arm functions as a T-square.

The wings swing or pivot in unison with each other. Thus, if one wing is moved in a certain direction, the other wing will move in a corresponding different direction over the same angular extent. One end of each of the two wings is provided with a set of teeth (as in the manner of gear teeth) which are arranged along an arc. These teeth mesh or interengage, to thereby ensure that motion of one wing will impart a corresponding motion to the other wing. These two sets of meshing teeth each have a center of curvature at the respective pivot pins which fasten the wings to one surface of the casing of the flexible tape.

BRIEF DESCRIPTION OF THE DRAWINGS

FIG. 1 is a perspective view, taken from beneath the measuring tape, showing the winged measuring tape of this invention in closed position, with the casing being shown as upright.

FIG. 2 is a view similar to FIG. 1, but with the wings in open position. with the two wings swung outwardly and forming a straight edge and T-square.

FIG. 3 is a view looking from the bottom upwardly of FIG. 2.

FIG. 4 is a view looking upwardly from the bottom towards the top of FIG. 1.

FIG. 5 is a side elevational view of the winged measuring tape construction of this invention when in the configuration of FIGS. 2 or 3, and further illustrates one mode of usage in combination with a piece of lumber of other workpiece.

DETAILED DESCRIPTION OF THE INVENTION

Referring now to FIG. 1 of the drawings, the numeral 10 denotes generally the winged measuring tape construction of this invention and includes a housing or casing, typically of metal, having opposite sides 12 and a front end surface 14. The casing is shown in an upright position. A conventional lock button 16 extends through surface 14, the button either locking or releasing flexible measuring tape 18, the tip of the latter provided with a 90 degree end or lip designated as 20. Tape 18 is provided with markings 19, as indicated, to denote units of length. Typically, tape 18 is coiled or wound to a spiral and is spring biased to a wound up configuration, whereby the tape must be pulled outwardly to use it. Tape 18 extends through end surface 14 by virtue of the indicated slot 21 in the latter. The bottom surface of the casing is designated as 22 and receives pintles or pivot pins 34 for mounting wings 30. One edge of each wing 30 is provided with a bent and elongated flange 32, with wing 30 and flange 32 being at ninety degrees to each other. Each pivoted wing is thus generally L-shaped in transverse cross section. Interengaged or meshing teeth 36 are provided at one end of each wing 30. Teeth 36 of each wing 30 extend along an arc, of about ninety degrees angular extent, the center of each arc being a respective pivot pin 34.

From a consideration of FIGS. 1 and 2, as well as a consideration of FIGS. 3 and 4, it is seen that by swinging the right-hand wing 30 toward the right, in the direction shown by the curved arrow of FIG. 1, the meshing of teeth 36 contiguous to the respective pivoted ends of wings 30 causes the left-hand wing 30 to swing at an equal angular amount but in the opposite direction. In the position illustrated in FIGS. 2 and 3, the wings are fully extended, and are prevented from swinging past their indicated aligned position 90 degrees by abutting wing end abutment surfaces 38. Thus, the movement of either wing 30, about its respective pintle or pivot pin 34 will cause a corresponding movement of the other wing. Pivots 34 may be screws or rivets or any other convenient means of pivotally linking or fastening a wing to the casing surface 22. In the folded, parallel configuration of FIG. 1, the wings are not used, but do not add significant volume to the tape casing.

In the extended wing configuration of FIG. 2 or 3, the aligned wings, with flanges 32, may function as a straight edge, as above noted. Additionally, in combination with the bottom 22 of the casing, a T-square is formed. Further, the measuring tape casing may be placed along an edge of a piece of lumber or the like, with flange 32 preventing motion of the casing when tape 18 is pulled and extended. Wings 30 and flange 32 thus also function to inhibit or preclude the casing of the measuring tape from tipping over. Thus if the casing and extended wings of FIG. 2 are placed upright on a horizontal surface, it is seen that wings 30 in conjunction with casing surface 22 will inhibit or prevent tipping over of the casing due to vibrations, accidental minor knocks, or wind.

In FIG. 5, a length of lumber or other workpiece 50 is shown as engaged at one end surface by bent forward tape end or lip 20, and at its other end surface by flanges 32 of outwardly extended wings 30. If the vertical height of the tape casing is two inches, for example, the user simply adds two inches to the tape measurement to obtain the length of workpiec 50. Further, as noted earlier, the casing and wings of this invention can be used, in the configuration of FIG. 2, as a square to mark material at ninety degrees accurately. If, for example, a 45 degree angle between wings 30 is desired, markings such as 42 (see FIG. 3) may be made on surface 22. Thus, aligning a wing 30 with such a marking will yield such an angle.

In order to prevent accidental movement of the arms a simple expedient is provided as seen in FIGS. 2 and 4. Located on surface 22 are two concave depressions 25 adjacent to slot 21. Each arm has a dimple 26 so posi 26 will rests in the concave depressions 25 positioned that when the arms are moved to closed position, dimples 26 are positioned in and retained temporarily by the depressions 25.

It will be apparent to those of skill in this art that alterations and modifications may obviously be made to the preferred embodiment described hereinbefore. As to all such obvious alterations and modifications, it is desired that they be included within the purview of my invention, which is to be limited only by the scope, including equivalents, of the following, appended claims.

I claim:

1. A measuring tape construction including a housing, said housing having a flexible measuring tape mounted therein for movement out of and back into said housing, said housing having a pair of straight wings each pivoted to a pivot carried by said housing, each said wing having a set of teeth along an arc at one end of a respective wing, said sets of teeth meshing with each other, whereby angular movement of one of said wings of said pair of wings causes corresponding angular movement of the other of said wings of said pair of wings.

2. The measuring tape construction of claim 1 wherein one end of each said wing is provided with an abutment surface contiguous to its respective said set of teeth, whereby said wings can together form a straight edge by virtue of said abutment surfaces abutting each other to prevent said wings from swinging to an angular position greater than 180 degrees apart.

3. The measuring tape construction of claim 1 wherein each said wing is generally L-shaped in transverse cross-section.

4. The measuring tape construction of claim 1 wherein said housing has a surface to which said wings are pivoted.

5. The measuring tape of claim 1 wherein each of said sets of arcuate teeth centers about a respective said pivot.

* * * * *